(12) United States Patent
Butler et al.

(10) Patent No.: US 11,212,380 B2
(45) Date of Patent: Dec. 28, 2021

(54) RUGGEDIZED VOICE AND DATA COMMUNICATIONS SYSTEM

(71) Applicants: Myron C. Butler, Edmond, OK (US); Mark Davis, Edmond, OK (US)

(72) Inventors: Myron C. Butler, Edmond, OK (US); Mark Davis, Edmond, OK (US)

(*) Notice: Subject to any disclaimer, the term of this patent is extended or adjusted under 35 U.S.C. 154(b) by 0 days.

(21) Appl. No.: 16/251,921

(22) Filed: Jan. 18, 2019

(65) Prior Publication Data
US 2020/0006972 A1   Jan. 2, 2020

Related U.S. Application Data

(63) Continuation of application No. 14/541,820, filed on Nov. 14, 2014, now Pat. No. 10,187,501.

(60) Provisional application No. 61/904,301, filed on Nov. 14, 2013.

(51) Int. Cl.
*H04M 1/02* (2006.01)
*H04M 1/18* (2006.01)

(52) U.S. Cl.
CPC .......... *H04M 1/0277* (2013.01); *H04M 1/18* (2013.01); *H02J 2207/20* (2020.01); *H04M 1/0274* (2013.01); *H04M 1/185* (2013.01); *H04M 2001/0204* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,192,430 A | * | 3/1980 | Cornou | B65D 19/18 220/1.5 |
| 4,554,999 A | * | 11/1985 | Kamaike | H02J 7/0078 187/290 |
| 6,330,152 B1 | * | 12/2001 | Vos | H05K 7/206 165/104.33 |
| 8,855,012 B1 | * | 10/2014 | Suri | H04L 12/2856 370/254 |
| 10,477,415 B1 | * | 11/2019 | Mar | H04W 8/245 |
| 2006/0019655 A1 | * | 1/2006 | Peacock | H04W 92/02 455/426.1 |
| 2011/0228701 A1 | * | 9/2011 | Hoffmann | H04W 84/10 370/254 |

* cited by examiner

*Primary Examiner* — Junpeng Chen
(74) *Attorney, Agent, or Firm* — Dunlap Codding, P.C.

(57) ABSTRACT

Ruggedized voice and data communication systems are disclosed having ruggedized enclosures for housing a communications board with at least one transceiver and a plurality of interfaces. The system has a power supply configured to receive a first voltage and convert the first voltage to a second voltage and provide the second voltage to the communications board.

24 Claims, 10 Drawing Sheets

RUGGEDIZED VOICE AND DATA COMMUNICATIONS SYSTEM

CROSS REFERENCE TO RELATED APPLICATIONS/INCORPORATION BY REFERENCE STATEMENT

The present patent application is a continuation of the patent application identified by U.S. Ser. No. 14/541,820, filed Nov. 14, 2014, which incorporates by reference the entire provisional patent application identified by U.S. Ser. No. 61/904,301, filed on Nov. 14, 2013, and claims priority thereto under 35 U.S.C. 119(e).

BACKGROUND

Remote and inhospitable environments, such as those often occurring around geological sites of interest, oilfield operations, highway construction, disaster response operations, rescue teams, and the like, often suffer from lack of reliable communications. Currently, communications devices equipped to connect to communication towers of a cellular network require stable power supplies. Such stable power supplies are generally unsuitable for remote or inhospitable environments or are too fragile to operate reliably in those environments. Therefore, a need exists for reliable long distance communication systems, compatible with existing voice and data networks, which may employ varying power types and reliabilities and survive in rugged terrain.

SUMMARY

Disclosed is a combination of communication and power control elements that has been packaged to function in hostile environments and rural areas where current communications infrastructure may be sparse or unavailable due to the limitations of previous technologies.

In some embodiments, a ruggedized voice and data communication system is described. The ruggedized voice and data communication system comprises a ruggedized enclosure, a communications board connected to the ruggedized enclosure, a power system electrically coupled to the communications board, a plurality of ports electrically coupled to the communications board, and an antenna connected to a first port of the plurality of ports. The communications board has at least one transceiver and a plurality of interfaces. The power system has a battery and a power supply. The battery is configured to supply the communications board with power at a predetermined voltage. The power supply is configured to receive a first voltage and convert the first voltage to a second voltage. The power supply is configured to supply the second voltage to the communications board for powering components on the communications board. The plurality of ports are connected to the ruggedized enclosure. Certain of the plurality of ports are connected to certain of the plurality of interfaces of the communications board and certain of the plurality of ports are connected to the power system. The antenna is in communication with at least one of the at least one transceiver.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

DETAILED DESCRIPTION OF EXEMPLARY EMBODIMENTS

Figure 1:
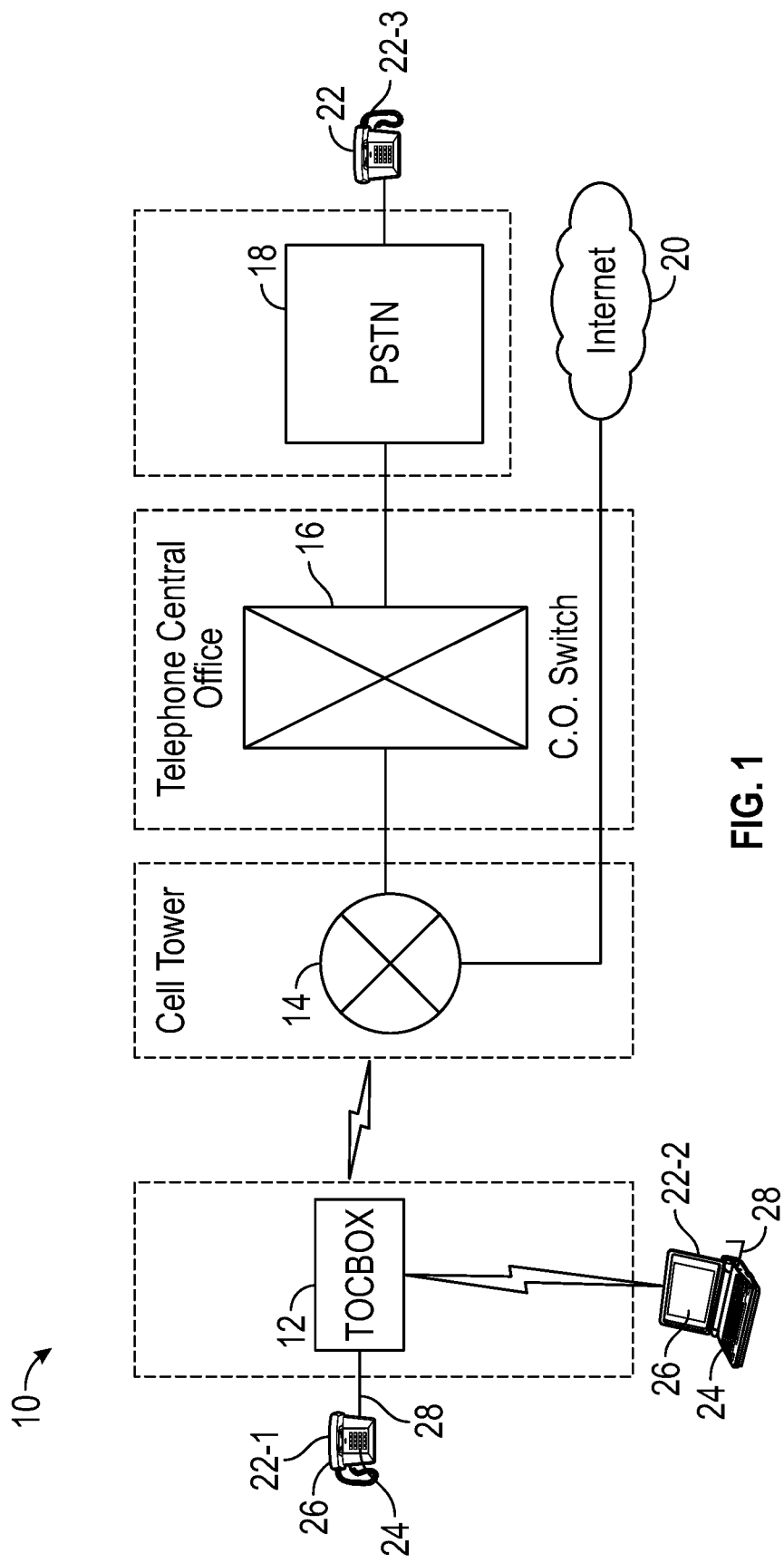
FIG. 1 is a block diagram of a communication system using a ruggedized voice and data communication system, in accordance with some embodiments of the present disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless otherwise stated.

The terminology and phraseology used herein is for descriptive purposes and should not be construed as limiting in scope. Language such as "including," "comprising,"

"having," "containing," or "involving," and variations thereof, is intended to be broad and encompass the subject matter listed thereafter, equivalents, and additional subject matter not recited.

Finally, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The present disclosure relates generally to a ruggedized voice and data communications system. In some embodiments, the ruggedized voice and data communication system may include a portable wireless Internet access device and may employ a high-powered quad-band transmitter and receiver with integrated wireless routing facilities and a simulated dial-tone plain old telephone service (POTS) line to provide both voice and data access through cellular networks such as any GSM Cellular Network world-wide. The ruggedized voice and data communications system may be compatible with any analog wired or cordless desk or wall telephone and provide ring generator for incoming call signaling.

In some embodiments, the ruggedized voice and data communication system may be implemented as a portable device housed in a rugged enclosure, such as a resin case, designed to enable construction personnel, oil and gas exploration personnel, offshore personnel, sailors, and others to access the internet and the Public Switched Telephone Network (PSTN) utilizing a powerful transmitter and a high-gain antenna to connect with cell towers in remote areas where the current cellular telephone and other Wi-Fi devices/or modems may be unable to establish connectivity.

The ruggedized voice and data communications system may be deployed in remote locations without access to commercial power and may rely on petroleum-powered generator sets. Field generator power may be fraught with frequency shifts, voltage fluctuations, and interruptions. In at least some embodiments, the present disclosure may provide a power conditioning function by use of a power supply and battery management device that may accept any alternating current source from 90 Volts to 260 Volts at any frequency between 45 and 65 Hertz or 12 Volts D.C. In some embodiments, the ruggedized voice and data communications system may integrate a battery, such as a gel cell or Lithium-ion battery, to mitigate power outages and provide uninterruptable power without human intervention.

At least some embodiments of the ruggedized voice and data communication system may include wireless networking functionality and components to communicate using Ethernet and 802.11 networking protocols. In some embodiments, the ruggedized voice and data communication system may also include functionality and a method to permit wireless printing through a universal serial bus (USB) port and 802.11 Wi-Fi components. In some embodiments, the ruggedized voice and data communications system may incorporate a voice interface providing POTS line features utilizing Dual-tone multi-frequency signaling (DTMF signaling) and a ringing generator.

Referring now to FIG. 1, shown therein is a block diagram of a communication system 10. The communication system 10 may include a ruggedized voice and data communication system 12, at least one communication tower 14 in communication with the ruggedized voice and data communication system 12, a communication network switch facility 16 in communication with the at least one communication tower 14, a PSTN 18 in communication with the communication network switch facility 16, and a data communication network 20 in communication with the at least one communication tower 14. A plurality of user devices 22 may be in communication with the communication system 10 at differing locations in relation to the communication system 10. For example, a first user device 22-1 and a second user device 22-2 of the plurality of user devices 22 may be in communication with the ruggedized voice and data communication system 12. A third user device 22-3 may be in communication with the PSTN 18 and thereby may be in communication with at least the first user device 22-1 by utilizing one or more elements of the communication system 10.

The at least one communication tower 14 may include, but is not limited to a cell site and/or base transceiver station. The cell site may be implemented as an antenna configured with one or more communications equipment. The one or more communications equipment may be positioned on a radio mast, a tower, or other location above ground level. The at least one communication tower 14 may create a cell within a cellular network such as a GSM communications network. The communications equipment may be one or more antennae, one or more set of transceivers having at least one transmitter and receiver, digital signal processors, and other suitable communications equipment.

The communication network switch facility 16 may include, but is not limited to, regional centers, international gateway exchanges, sectional centers, primary centers, toll centers, tandem switches, and/or telephone exchanges. In some embodiments, the communication network switch facility 16 and the PSTN 18 may be implemented together. In some other embodiments, the communication network switch facility 16 may be a telephone central office to which a voice connection may be established. The PSTN 18 may be an aggregate and include telephone lines, fiber optic cables, microwave transmission links, cellular networks, communications satellites, undersea telephone cables, switching centers, and/or combinations thereof.

The data communication network 20 may receive data from the plurality of user devices 22 and/or the ruggedized voice and data communication system 12 via the at least one communication tower 14, the communication network switch facility 16, and/or the PSTN 18. In some embodiments, the data communication network 20 may be implemented as a wireless and/or wired network (e.g., the world wide web or Internet, or any other computer network configured to allow bidirectional exchange of data and/or signals between computer processors), and may permit bi-directional communication of information and/or data between the ruggedized voice and data communication system 12 and/or the plurality of user devices 22.

The data communications network 20 may be almost any type of network. For example, the network may interface by optical and/or electronic interfaces, and/or may use a plurality of network topographies and/or protocols including, but not limited to, Ethernet, TCP/IP, circuit switched paths, and/or combinations thereof. In some embodiments, the network may be implemented as the World Wide Web (or Internet), a local area network (LAN), a wide area network (WAN), a metropolitan network, a wireless network, a cellular network, a Global System for Mobile communications (GSM) network, a code division multiple access (CDMA) network, a 3G network, a 4G network, a satellite network, a radio network, an optical network, a cable network, a public switched telephone network, an Ethernet network, combinations thereof, and/or the like. It is also conceivable that in the near future, embodiments of the present disclosure may use more advanced networking topologies.

The plurality of user devices 22 may be connected or otherwise operably coupled to the ruggedized voice and data communication system 12 via the data communication network 20, the PSTN 18, and/or via a direct wired or wireless communication link to the ruggedized voice and data communication system 12. Each of the plurality of user devices 22 may be implemented as a smartphone, a tablet, a laptop computer, a personal computer, a desktop computer, a computer terminal, a computer workstation, an e-book reader, a wireless network-capable handheld device, a digital video recorder, a personal digital assistant, a printer, or combinations thereof, for example. The user device 22, in some embodiments, may be provided with one or more processor (not shown), one or more non-transitory processor readable medium (not shown), an input device 24, an output device 26, and a communications device 28.

In some embodiments one or more input devices 24 may be capable of receiving information input from a user, processors, and/or environment, and transmit such information to the processor and/or the data communication network 20. The one or more input devices 24 may include, but are not limited to, implementations as a keyboard, a touchscreen, a mouse, a microphone, a telephone handset, a fingerprint reader, infrared port, slide-out keyboard, flip-out keyboard, cell phone, PDA, remote control, network interface, speech recognition, gesture recognition, eye tracking, brain-computer interface, combinations thereof, and/or other suitable input devices.

The output device(s) 26 may be capable of outputting information in a form perceivable by a user and/or processor(s). The output devices 26 may include, but are not limited to, implementations as a screen, a touchscreen, a speaker, a printer, a website, a television set, a smart phone, a PDA, a cell phone, a laptop computer, and optical head-mounted display (OHMD), combinations thereof, and/or other suitable output devices capable of rendering data in a user perceivable format. In some embodiments, the input device 24 and the output device 26 may be housed in a single device.

The communications device 28 may be a transceiver, an antenna, combinations thereof and/or other suitable communications device capable of transmitting and/or receiving signals from the communication system 10.

The user device 22 may be configured to interface with the ruggedized voice and data communication system 12, the data communication network 20, and/or the PSTN 18 via a wireless or wired interface. The one or more non-transitory processor readable medium of the user device 22 may store processor executable instructions or software applications, and a web browser or a smartphone application (e.g., native software application running on a user device and configured to communicate with other user devices) configured to employ one or more communication protocols for communication with other user devices over the PSTN 18 and/or the data communication network 20. In some embodiments, the one or more communication protocols may be GSM related protocols, General Packet Radio Services (GPRS) protocols, Enhanced Data rates for GSM Evolution (EDGE) protocols, Universal Mobile Telecommunications System (UMTS) protocols, Long Term Evolution (LTE) protocols, 802.11 protocols, and/or other communications protocols.

Figure 2:
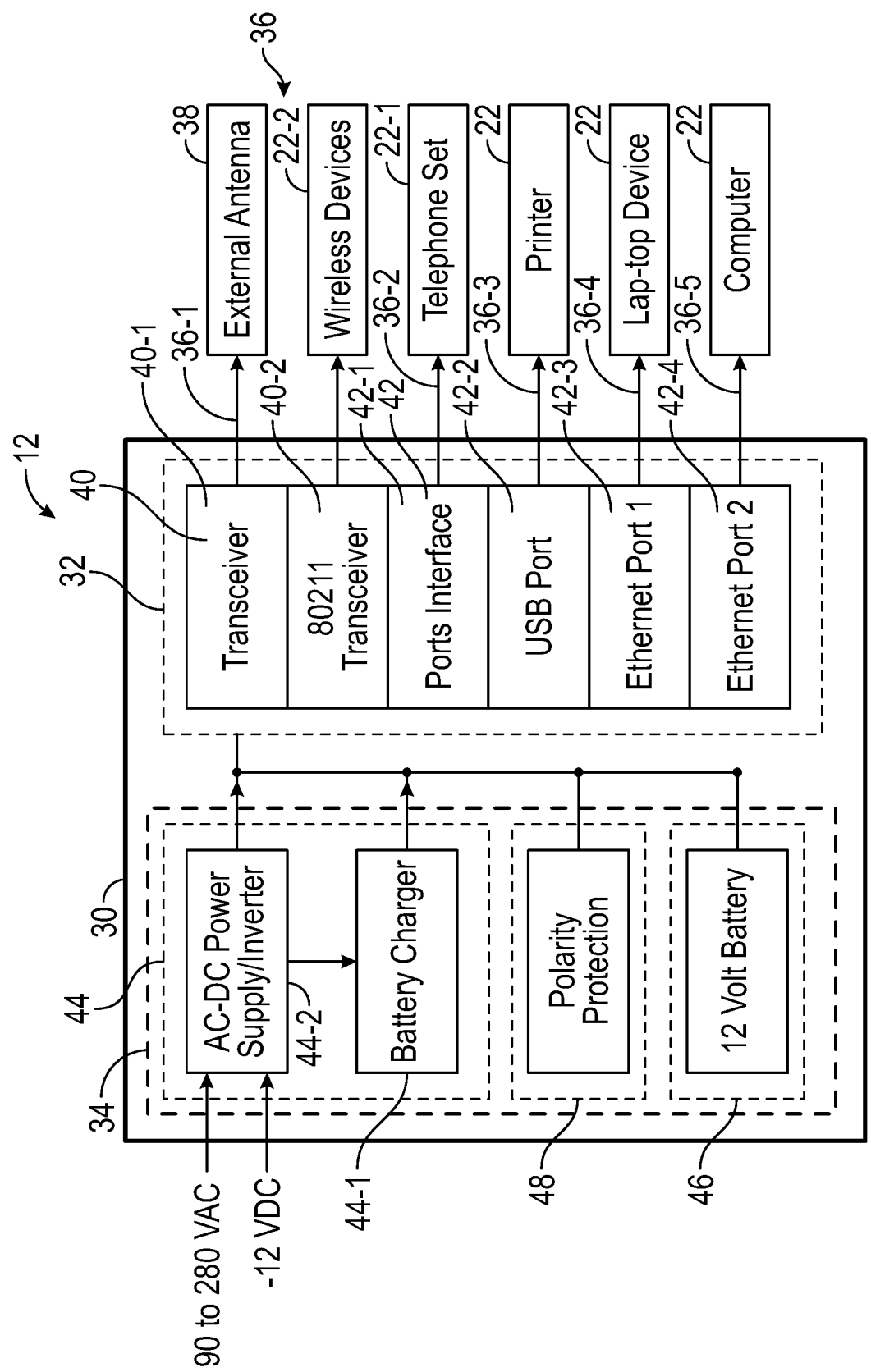
FIG. 2 is a block diagram of the ruggedized voice and data communication system, in accordance with some embodiments of the present disclosure.

Referring now to FIG. 2, a block diagram of the ruggedized voice and data communication system 12 according to some embodiments is shown. The ruggedized voice and data communication system 12 is provided with a ruggedized enclosure 30, a communications board 32 mounted within the enclosure 30, a power system 34 coupled to the communications board 32 and supplying power thereto in a predetermined voltage, a plurality of ports 36, and an antenna 38 coupled to a first port 36-1 of the plurality of ports 36.

The communications board 32 includes at least one transceiver 40 and a plurality of interfaces 42 electrically coupled to the at least one transceiver 40. In some embodiments, the communications board 32 may be implemented on a single silicon circuit board with the at least one transceiver 40 and the plurality of interfaces 42 positioned on the silicon circuit board.

As shown in FIG. 2, the communications board 32 may be provided with a first transceiver 40-1 and a second transceiver 40-2. The first transceiver 40-1 may be configured to transmit and receive signals through the antenna 38 via the communications tower 14. In some embodiments, the first transceiver 40-1 may be a GSM transceiver capable of transmitting/receiving packetized voice and data transmissions over a GSM network, for example. Alternatively, the first transceiver 40-1 may be a CDMA transceiver capable of transmitting/receiving packetized voice and data transmission over a CDMA network.

The second transceiver 40-2 may be configured to transmit and receive signals via 802.11 protocols, for example, to form a Local Area Network (LAN) capable of receiving data to be relayed to the communication system 10 via the first transceiver 40-1 and the antenna 38. In some embodiments, the second transceiver 40-2 may be implemented as a wireless router implementing 802.11 communication protocols.

In some embodiments, a data packet modem (not shown) may be included in the communications board 32 to transfer data between the first transceiver 40-1 and the second transceiver 40-2. For example, in some embodiments, the data packet modem may receive packetized data from the second receiver 40-2 which conforms to 802.11 protocols. The data packet modem may process and/or re-encode the packetized data of the second receiver 40-2 and transfer the re-encoded packetized data to the first transceiver 40-1 for transmission in a cellular network, such as a CDMA and/or GSM network. In some embodiments, the data packet modem may also receive packetized data from the first transceiver 40-1 and transfer, along with processing and/or re-encoding, the packetized data to the second transceiver 40-2 for transmission to the user device 22 in communication with the second transceiver 40-2. In some further embodiments, the data packet modem may perform similar processing and re-encoding functions for packetized data routed through the plurality of ports 36. The plurality of interfaces 42 may be provided as a POTS interface 42-1, a USB interface 42-2, a first Ethernet interface 42-3, and a second Ethernet interface 42-4. Although the plurality of interfaces 42 are shown as specific types of interfaces, it will be understood by one skilled in the art that the plurality of interfaces 42 may vary in type. The POTS interface 42-1 may be implemented as a POTS simulator providing an analog telephone interface circuit.

In some embodiments, the first transceiver 40-1 may include a high-power transmitter, such as a 2 watt transmitter. In some embodiments, the first transceiver 40-1 may be configured to transmit at frequencies in a range between 670 MHz and 6.0 GHz, for example. In other embodiments, the transmitter may be configured to transmit at frequencies in a range between 700 MHz and 2.1 GHz, for example. In yet other embodiments, the transmitter may be configured to transmit at frequencies in a range between about 900 MHz and about 1.2 GHz, for example.

In some embodiments, the second transceiver 40-2 may conform to 802.11 and applicable Federal Communications Commission standards for 802.11 transceivers, including standards for power output and frequency range.

In some embodiments, the power system 34 may be provided with a power supply 44, a battery 46, and a polarity protection unit 48. The power supply 44 may be dimensioned and configured to be positioned within the ruggedized enclosure 30. In some embodiments, the power supply 44 may be connected to the ruggedized enclosure 30 via a power system mounting plate, described in more detail below.

The power supply 44 may include a battery charger 44-1 and a switching power supply 44-2. In some embodiments, the switching power supply 44-2 may also function as a power inverter. The switching power supply 44-2 may provide protection against overvoltage, under voltage, unstable frequencies, high-voltage spike protection, and power surges. The switching power supply 44-2 may be configured to receive power which varies in both voltage and frequency. For example, in some embodiments, a first voltage range, such as voltages in the range from 90-250 Volts A.C. may be at a frequency range between 50 and 60 Hz. The A.C. power may be in a range from about 100 mA to about 500 mA, for example. The switching power supply 44-2 may also be configured to receive D.C. voltage in a range between 10.5 and 12.5 Volts D.C., for example. The D.C. power may be in a range of about 2,500 mA, for example.

The switching power supply may, in some embodiments, convert the received A.C. power into D.C. power conforming to the frequency and voltage used by the communications board 32. In some embodiments, the switching power supply 44-2 may be configured to receive D.C. power from a cigarette lighter adapter, for example. In either event, the power supply 44 is configured to convert the power in the first voltage range, for example 90 Volts A.C., into a second voltage, for example 12 Volts D.C., suitable for the communications board 32 and supply the second voltage to the communications board 32. The power supply 44 may also be configured to provide battery management, including battery charging and logic level voltage control, as well as power conditioning and power conversion from A.C. to D.C.

The battery 46 may be implemented as a gel cell battery, a Lithium Ion battery, and/or any other suitable battery. The battery 46 may be dimensioned and configured to be positioned within the ruggedized enclosure 30 and connected thereto via the power system mounting plate that is described in more detail later. In some embodiments, the battery 46 may be configured to provide 12 Volt D.C. power to the communications board 32. In some embodiments, the battery 46 may be configured to provide uninterruptable power to the power supply 44 to be conditioned into power suitable for the communications board 32. For example, in some embodiments, the communications board 32 may use 5 Volts D.C. power and the power supply 44 may act as a D.C. to D.C. converter. In this embodiment, when no A.C. power is applied to the power system 34, the power supply 44 may convert the 12 Volt D.C. power of the battery 46 into the 5 Volt D.C. power used by the communications board 32. The transition between A.C. power received by the power system 34 and D.C. power provided by the battery 46 to the power supply 44 may be performed without user interaction. In some embodiments, the battery 46 may be configured to continually provide power to the communications board 32 without user intervention until a user selects a battery interface switch, described in greater detail below.

The polarity protection unit 48 may also employ a diode bridge in an arrangement of four diodes in a bridge circuit configuration that provides the same, or substantially the same polarity of output for either polarity of input. The polarity protection unit 48 may permit normal functioning of D.C. powered equipment when a battery has been installed backwards, or when the leads (wires) from a D.C. power source has been reversed. The polarity protection unit 48 may also protect the power system 34 and the communications board 32 from potential damage caused by reverse polarity.

As shown in FIG. 2, the plurality of ports 36 may include the first port 36-1, a second port 36-2, a third port 36-3, a fourth port 36-4, and a fifth port 36-5. In this example, the first port 36-1 is an antenna port configured to couple the antenna 38 to the communications board 32. The second port 36-2 is a Plain Old Telephone Service (POTS) port. In at least some embodiments, the second port 36-2 may be a 6P6C jack conforming to the International Organization for Standardization (ISO) standard 8877 for use with registered jacks such as RJ11, RJ14, and RJ 25 modular connectors. The second port 36-2 may be electrically coupled to the POTS interface 42-1 to provide telephone service functionality to an analog telephone connected to the second port 36-2. The third port 36-3 is a Universal Serial Bus (USB) port 36-3. The third port 36-3 may be electrically coupled to the USB interface 42-2. The fourth and fifth ports 36-4 and 36-5 may be two Ethernet ports 36-4 and 36-5. In at least some embodiments, the fourth and fifth ports 36-4 and 36-5 may be 8P8C jacks for use with RJ45 modular connectors. The fourth and fifth ports 36-4 and 36-5 may be electrically coupled to the first and second Ethernet interfaces 42-3 and 42-4, respectively.

The antenna 38 may be implemented as a unity gain antenna, a base load antenna, a high-gain antenna, a monopole antenna, a high-gain monopole antenna, a directional antenna, a log periodic antenna, a Yagi, a marine antenna, any other suitable antenna, and/or combinations thereof. For example, in some embodiments, the antenna 38 may be a 5 and ½ dB gain antenna, a 9 dB gain marine antenna, a 10 dB gain log periodic antenna, or a 19 dB gain Yagi antenna, depending on conditions in which the ruggedized voice and data communication system 12 is being deployed. The antenna 38 may be connected to the antenna port 36-1 and thereby be electrically coupled to the first transceiver 40-1 to receive and transmit voice and/or data communications to the at least one communications tower 14.

Referring now to FIGS. 2 and 3A-3E, an embodiment of the ruggedized voice and data communication system 12 and the ruggedized enclosure 30 is depicted. In some embodiments, the ruggedized enclosure 30 has a first mating component 50 and a second mating component 52 which form the ruggedized enclosure 30. The ruggedized enclosure 30 may have a plurality of sides 54 defining an interior 56 and an exterior 58. The ruggedized enclosure 30 is also provided with one or more hinges 60, one or more closure mechanism 62, a port opening 64 formed within one of the plurality of sides 54 and extending between the interior 56 and the exterior 58, and a plurality of through holes 66 formed within at least one of the plurality of sides 54 and extending between the interior 56 and the exterior 58. The first and second mating components 50 and 52 may be formed from a rigid polycarbonate plastic material, resin material, metal, or any other suitable material capable of providing protection to the communication board 32 and the power system 34 mounted therein.

The one or more hinges 60 are located on a first side 54-1 of the plurality of sides 54 to permit opening and closure of the ruggedized enclosure 30. Although shown on the exterior 58 of the ruggedized enclosure 30, one skilled in the art would understand that the one or more hinges 60 may be positioned on the interior 56 or the exterior 58. The one or more closure mechanism 62 is located on a second side 54-2 to secure the first and second mating component 50 and 52 together in a closed relationship. Although the first and second sides 54-1 and 54-2 are shown in FIGS. 3A-3E as positioned opposite to one another, it should be understood by one skilled in the art that the one or more hinges 60 and the one or more closure mechanism 62 may be provided on non-opposing ones of the plurality of sides 54. The one or more closure mechanism 62 may be a latch, a buckle, a lock, a strap, a snap, or any other suitable mechanism configured to secure the first and second mating components 50 and 52.

Figure 3A:
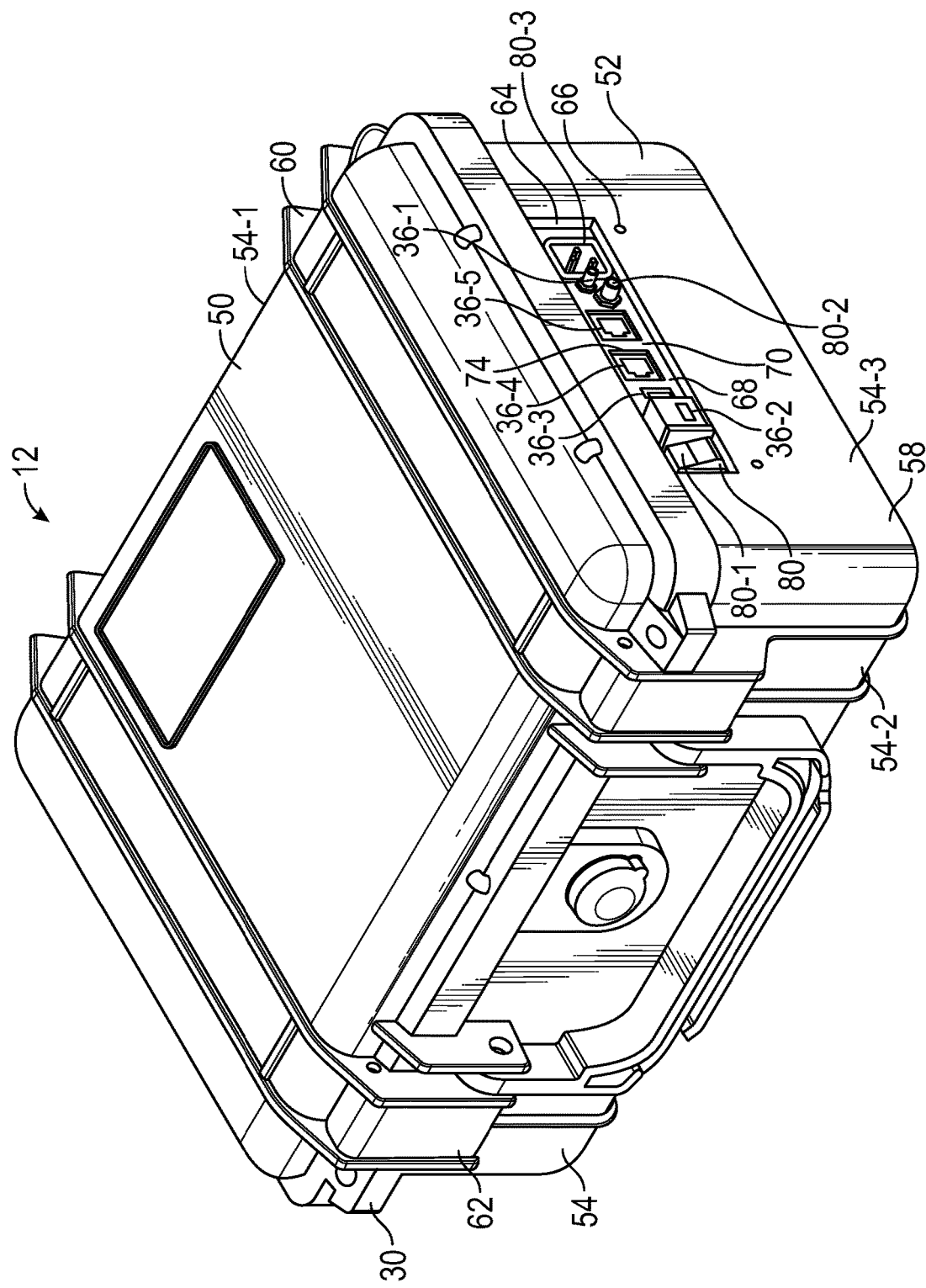
FIG. 3A is a perspective view of the ruggedized enclosure of the ruggedized voice and data communication system in a closed orientation.

The port opening 64 is formed in and defined by a third side 54-3 of the ruggedized enclosure 30. As shown in FIGS. 3A and 3C, the port opening 64 may be positioned on the third side 54-3 separate from the one or more hinges 60 and the one or more closure mechanism 62, but it should be understood that the port opening 64 may be formed in any of the plurality of sides 54. The plurality of through holes 66 are formed within the third side 54-3 passing from the exterior 58 to the interior 56 of the ruggedized enclosure 30. Certain of the plurality of through holes 66 may be configured to receive a connection member (not shown) to mount a jacking plate 68, discussed in greater detail below, to which the plurality of ports 36 may be mounted.

Referring now to FIGS. 2, 3A, 3B, and 3C, the jacking plate 68 is provided with a first portion 70, a second portion 72 formed at an angle with respect to the first portion 70, a plurality of port holes 74 formed as through holes within the first portion 70, and a plurality of mounting holes 76 formed as through holes within the first and second portions 70 and 72. In some embodiments, the jacking plate 68 may be mounted to the interior 56 of the ruggedized enclosure 30 via connection members (not shown) extending through certain of the plurality of mounting holes 76 formed in the first portion 70 of the jacking plate 68 and certain of the plurality of through holes 66 in the third side 54-3 of the ruggedized enclosure 30.

In some embodiments, the jacking plate 68 may be mounted to the ruggedized enclosure 30 with a seal (not shown) to form a dust or water tight connection. The plurality of ports 36 may be connected to the jacking plate 68 to provide a connection between the communications board 32 and the power system 34, in the interior 56 of the ruggedized enclosure 30, and the plurality of user devices 22 outside of the ruggedized enclosure 30. The plurality of ports 36 may be connected to the jacking plate 68 via connection members (not shown) and mounting holes, via soldering, clamps, clips, or any other suitable connection mechanism.

Figure 3B:
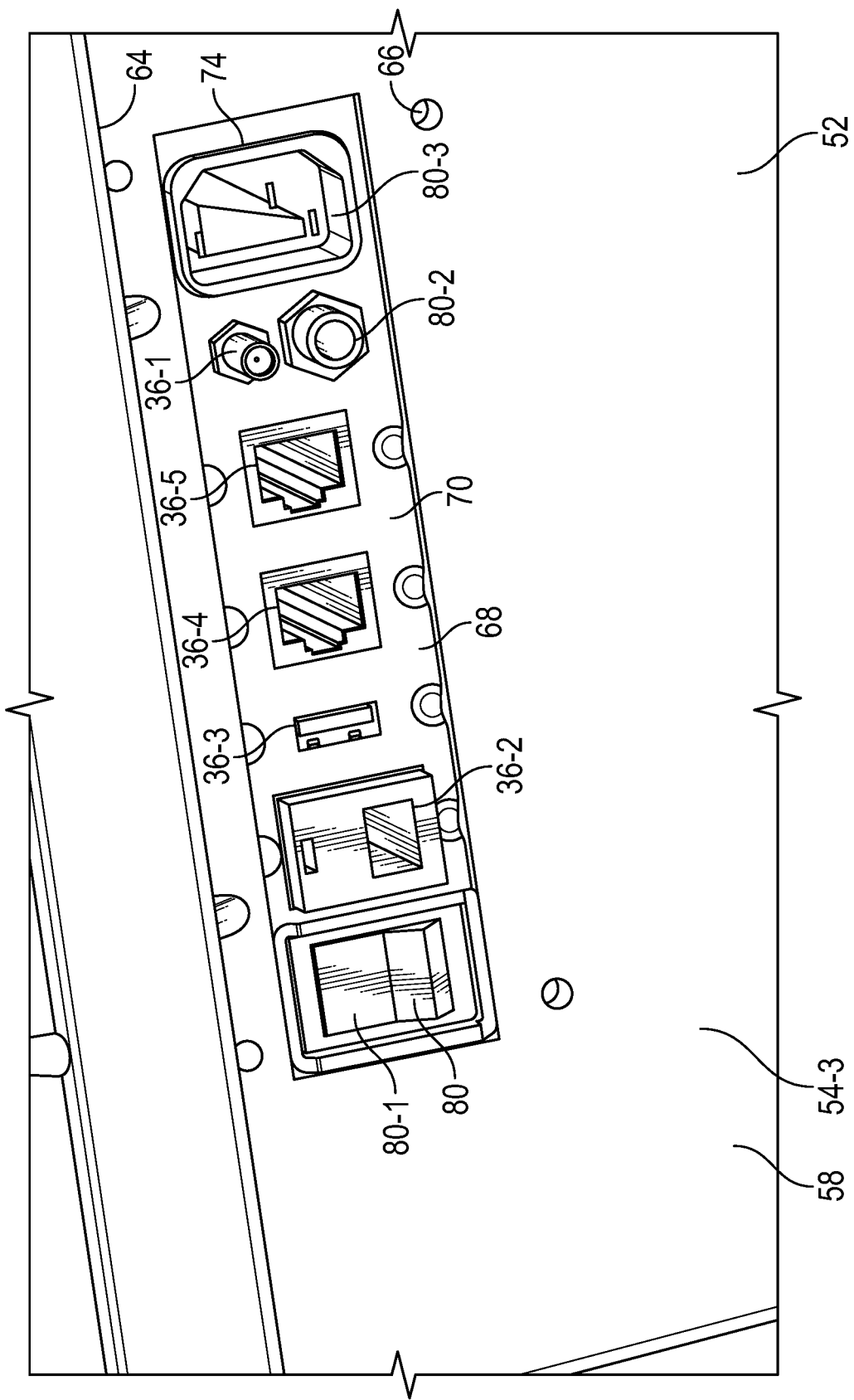
FIG. 3B is another perspective view of the ruggedized enclosure in the closed orientation.
Figure 3C:
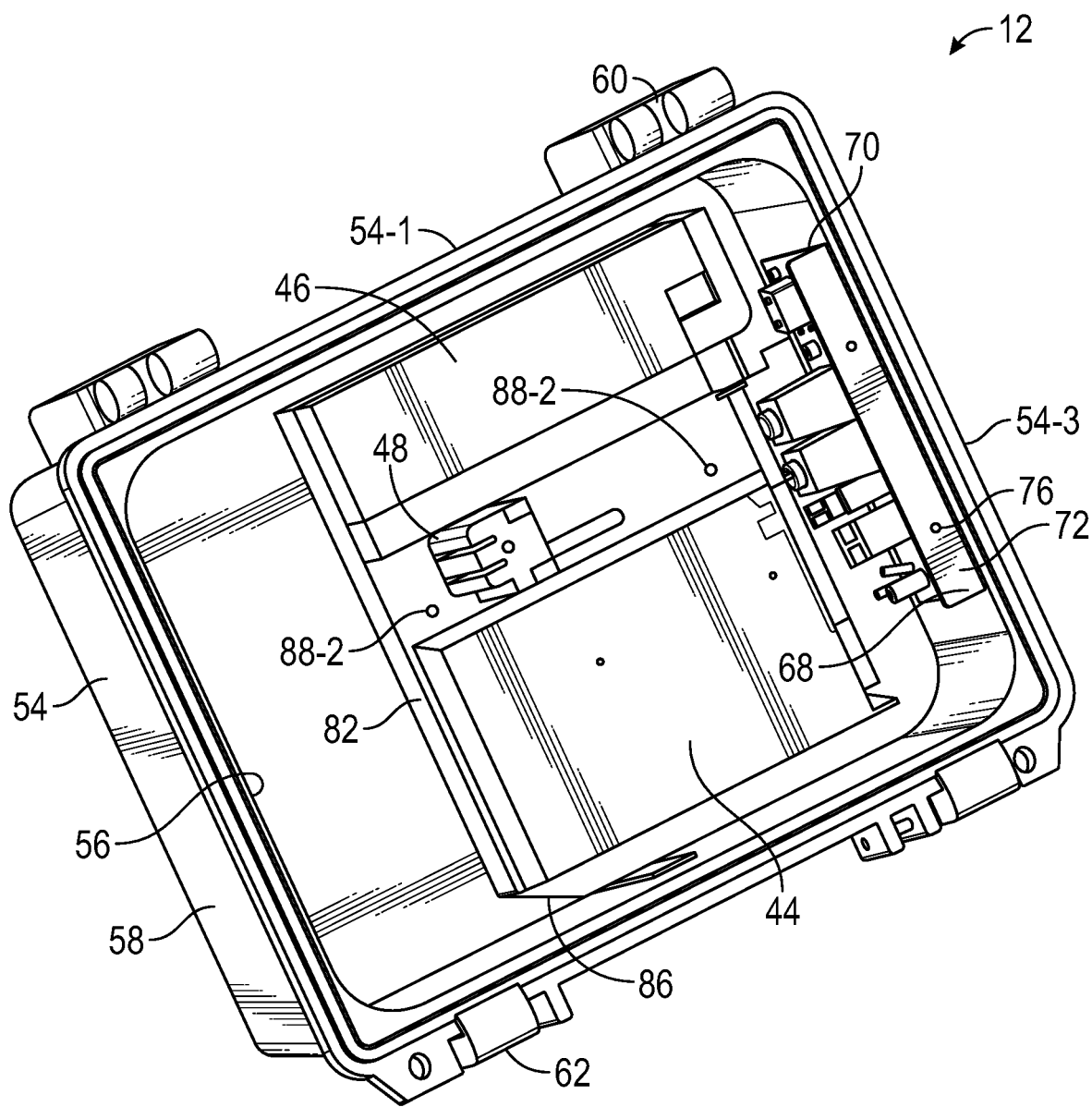
FIG. 3C is a perspective view of the ruggedized enclosure of FIG. 3A in an open orientation with a power system mounted in the ruggedized enclosure.

As shown in FIGS. 3A and 3B, in some embodiments, the ruggedized voice and data communication system 12 may be provided with a plurality of interfaces 80 to provide power input and outputs to the ruggedized voice and data communication system 12. The plurality of interfaces 80 may be connected to the jacking plate 68 via certain of the plurality of port holes 74 in the first portion 70. As shown, the plurality of interfaces 80 may include a battery interface switch 80-1, a D.C. power interface 80-2, and an A.C. power interface 80-3. The battery interface switch 80-1 may be configured to disconnect or otherwise disable the battery 46 from operation as an uninterruptable power supply. In some embodiments, where the battery 46 operates on a continuous basis, deactivation of the battery 46 using the battery interface switch 80-1 prevents the battery 46 from draining during storage or unpowered transportation of the ruggedized voice and data communication system 12. In some embodiments, the D.C. power interface 80-2 may be configured to be connected to a 12 volt D.C. barrel connector often used in vehicles as a power adapter connection to a vehicle's cigarette lighter. In some embodiments, the D.C. power interface 80-2 may be configured to be connected to a photovoltaic system to obtain solar power, a wind turbine to obtain wind power, or other suitable power generation mechanism. In some embodiments, the A.C. power interface 80-3 may be implemented as an A.C. entrance connection through which an A.C. power cable may be connected between the ruggedized voice and data communication system 12 and a source of A.C. power, such as a petroleum based generator.

Referring now to FIG. 3C, in some embodiments, a power system mounting plate 82 is used to mount the power system 34 to the interior 46 of the ruggedized enclosure 30. The power system mounting plate 82 may be provided with a first portion 84, a second portion 86 positioned at an angle with respect to the first portion 84, and a plurality of through holes 88 formed within and defined by the first and second portions 84 and 86. The power supply 44, the battery 46, and the polarity protection unit 48 may be mounted to the power system mounting plate 82 via connecting members (not shown) extending through first through holes (not shown) of the plurality of through holes 88 in the first portion 84 of the power system mounting plate 82. The power system mounting plate 82 may then be mounted to the interior 56 of the ruggedized enclosure 30 via connecting members (not shown) extending through second through holes 88-2 of the plurality of through holes 88 in the first portion 84.

Referring now to FIGS. 3D, 3E, 4A, 4B, and 5, the communications board 32 is mounted to a user interface plate 90. The user interface plate 90 may be connected to the jacking plate 68 and the power system mounting plate 82 to enclose the communications board 32 and the power system 34 within a first portion 92 of the ruggedized enclosure 30. The user interface plate 90 may be provided with a first portion 94, a second portion 96 positioned at an angle with respect to the first portion 94, a plurality of first through holes 98 formed in and extending through the first portion 94, a plurality of second through holes 100 formed in and extending through the second portion 96, and one or more indicator 102.

Figure 3D:
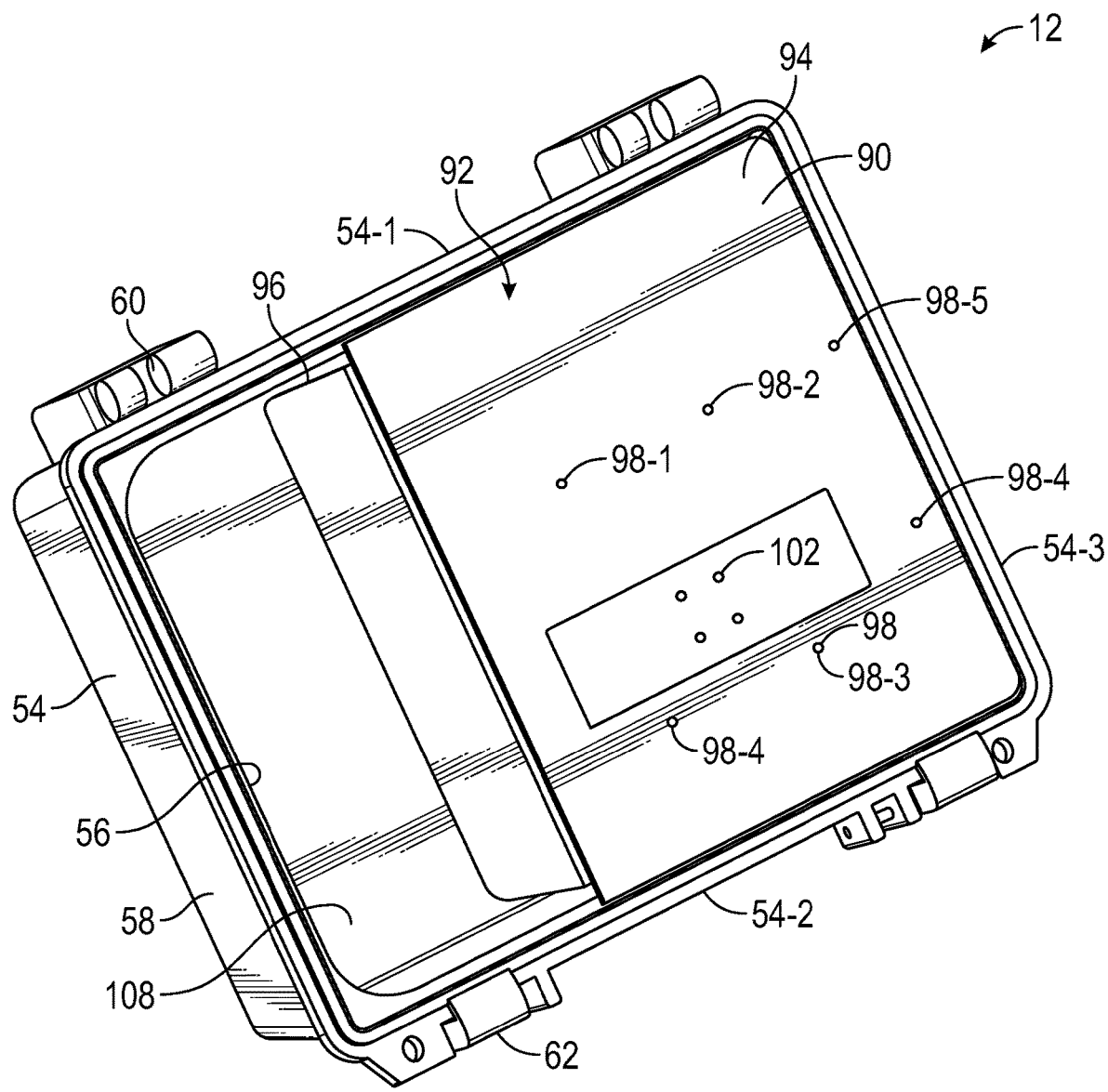
FIG. 3D is a perspective view of a user interface plate of the ruggedized voice and data communication system of FIG. 3A.
Figure 3E:
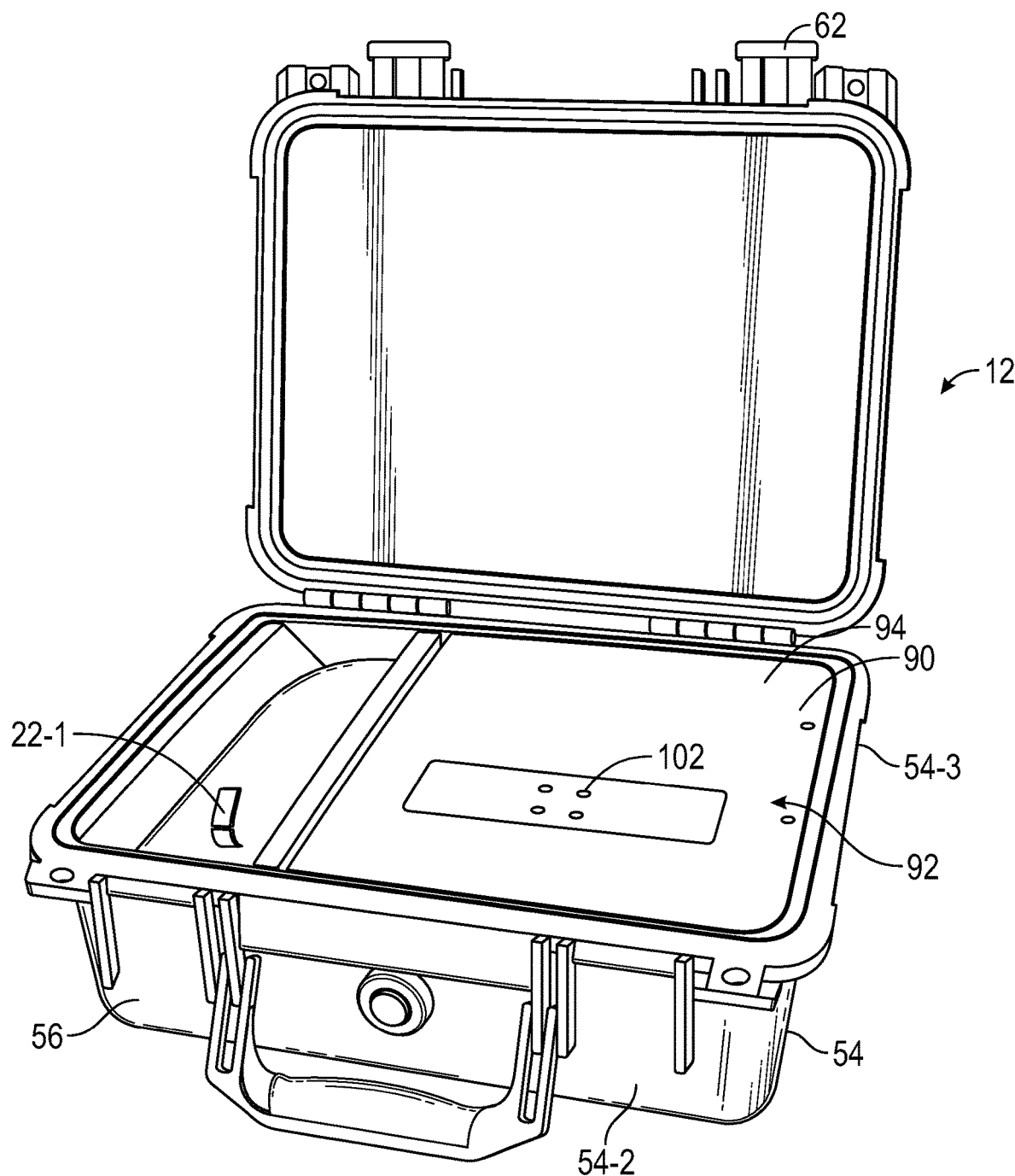
FIG. 3E is a perspective view of the ruggedized voice and data communication system with the user interface plate and a user device.
Figure 4A:
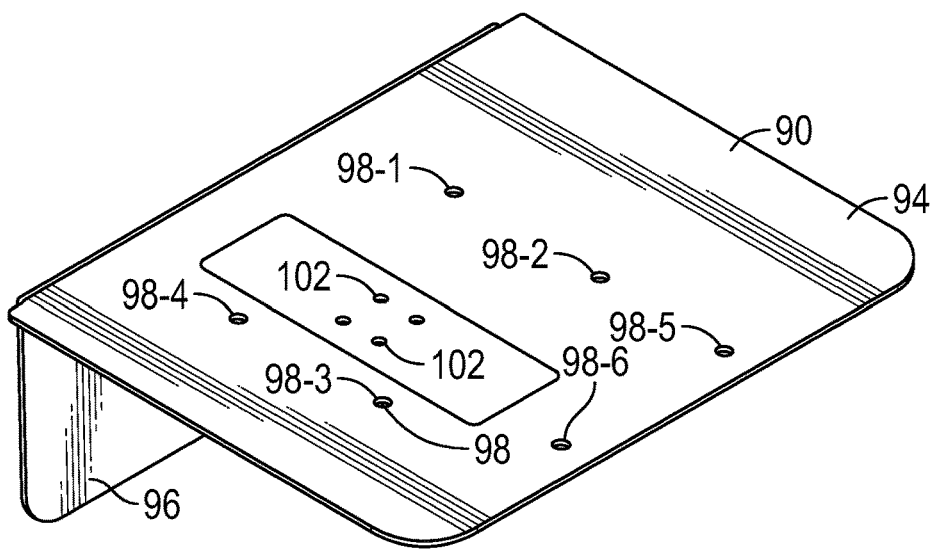
FIG. 4A is a perspective view of the user interface plate, in accordance with some embodiments of the present disclosure.

As shown in FIGS. 3D and 4A, the user interface plate 90 is provided, in some embodiments, with a plurality of communication board mounting holes 98-1-98-4 of the first through holes 98 which may cooperate with connection members 99-1-99-4 (see FIG. 5) to enable mounting the communications board 32 to the user interface plate 90. In at least some embodiments, the communications board 32 may be mounted to the user interface plate 90 using spacer elements to mount the communications board 32 a distance away from the user interface plate 90 while maintaining a distance from the power system 34. Jacking plate mounting through holes 98-5 and 98-6 of the first through holes 98 may cooperate with connection members (not shown) to enable connecting the user interface plate 90 with the jacking plate 68.

Figure 4B:
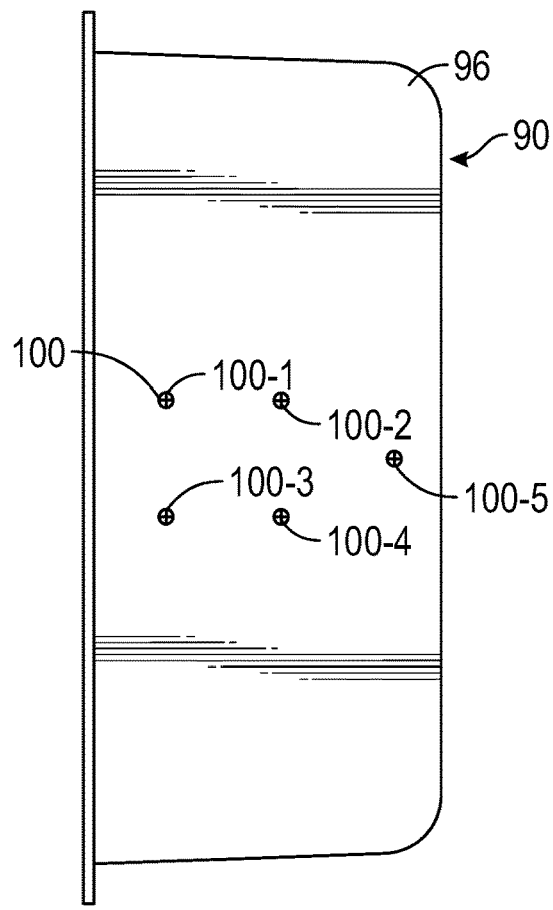
FIG. 4B is a side elevational view of the user interface plate of FIG. 4A.
Figure 5:
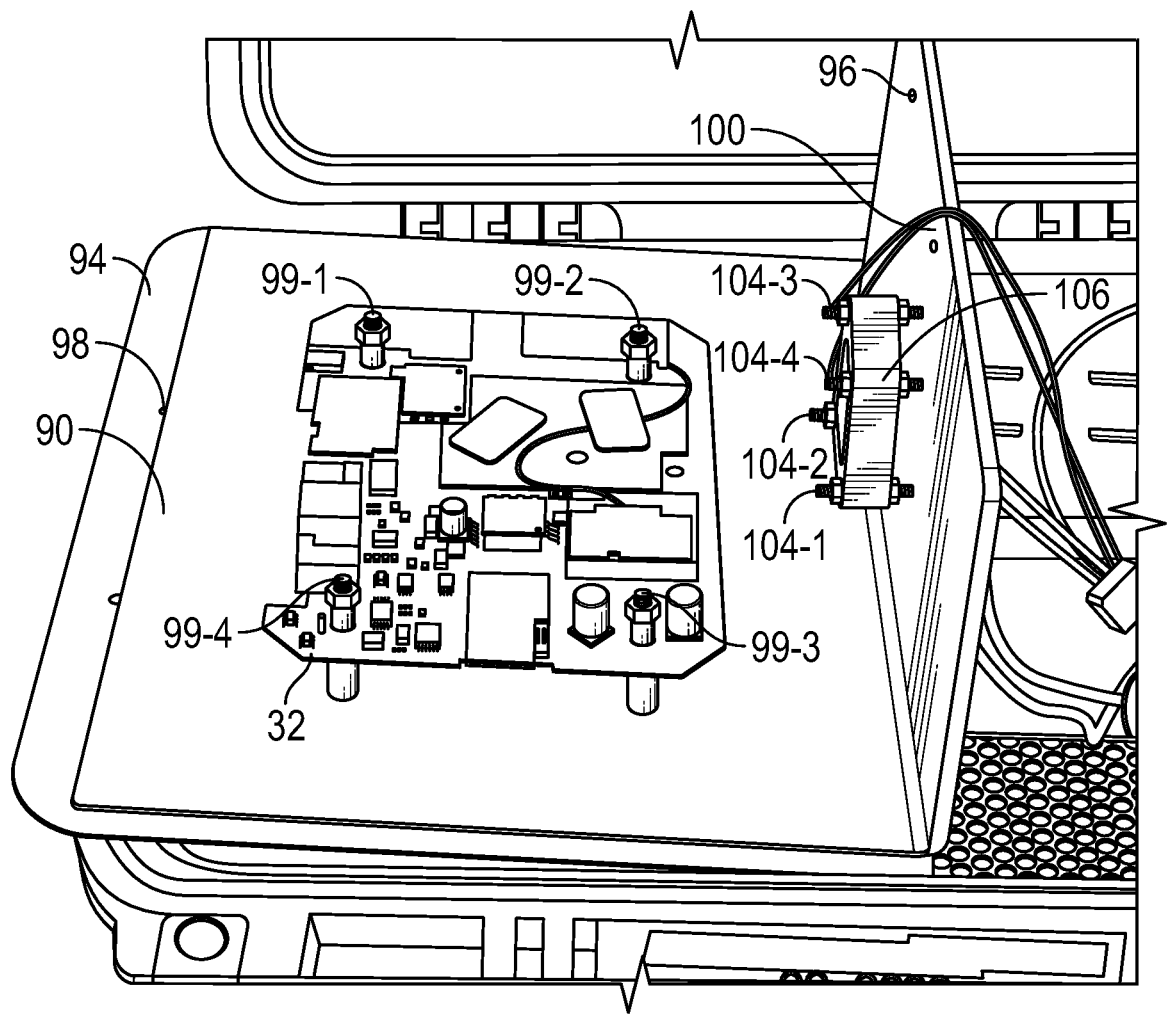
FIG. 5 shows a communications board of the ruggedized voice and data communication system, in accordance with some embodiments of the present disclosure, mounted to the user interface plate of FIG. 4A.

As shown in FIGS. 4B and 5, certain of the second through holes 100 may be a plurality of fan connection mounting holes 100-1-100-4. The fan connection mounting holes 100-1-100-4 may cooperate with connection members 104-1-104-4 to enable mounting of a fan 106 to the second portion 96 of the user interface plate 90. The fan 106 may be a 12 volt D.C. fan, or any other suitable fan, dimensioned and configured to be mounted to the user interface plate 90. In some embodiments, the fan 106 may circulate air through the ruggedized enclosure 30 so as to equalize temperature between the first portion 92 housing the communication board 32 and the power system 34 and a second portion 108 configured to receive and house the user device 22-1. Certain of the second through holes 100 may be a mounting plate through hole 100-5 positioned within the second portion 96 of the user interface plate 90 and configured to cooperate with a connection member (not shown) to connect the user interface plate 90 with the power system mounting plate 82.

The one or more indicator 102 may be lighted indicators, LED lights, an LCD display, an LED display, or any other suitable indicator. The one or more indicator 102 may provide the user with a user interaction element, indicating presence, absence, and/or levels of power, connectivity, communication speed, communication strength, battery life, and other predetermined feedback from the ruggedized voice and data communication system 12.

Figure 6:
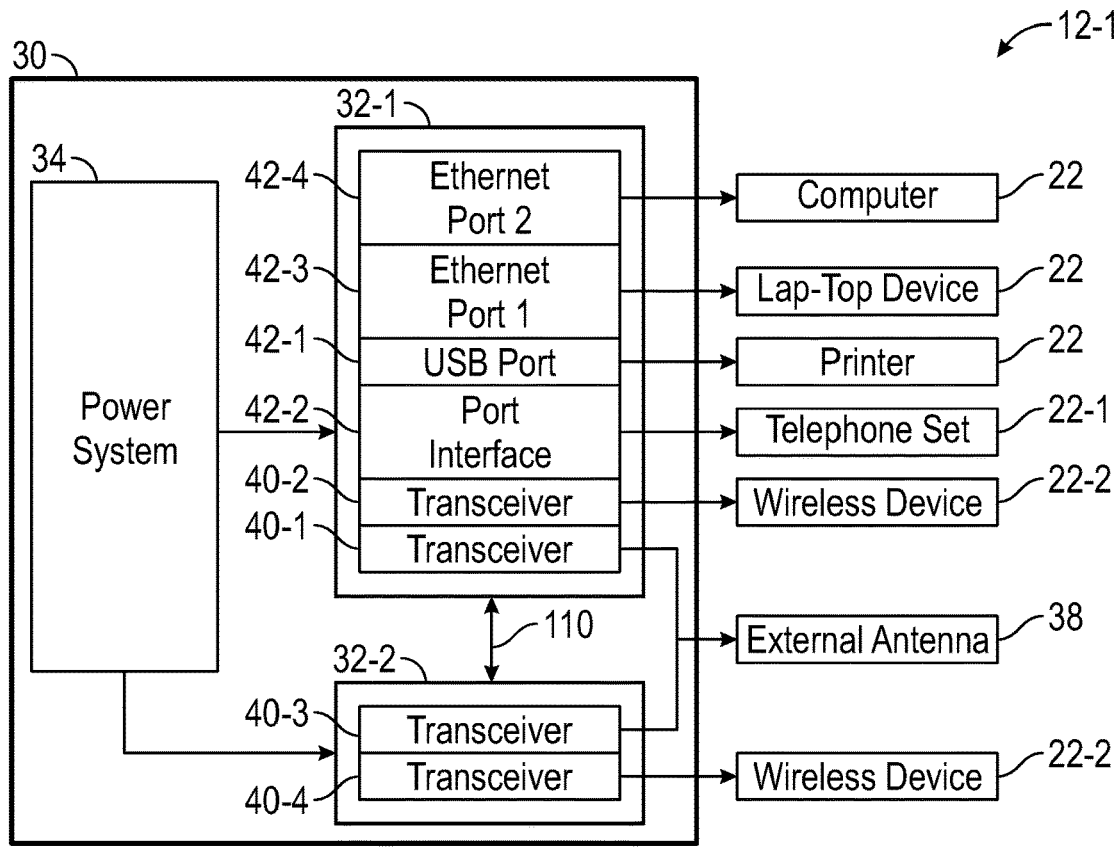
FIG. 6 is a block diagram of a second embodiment of a ruggedized voice and data communication system, in accordance with some embodiments of the present disclosure.

FIG. 6 illustrates another exemplary embodiment of the ruggedized voice and data communication system 12-1. The ruggedized voice and data communication system 12-1 is designed to leverage the coverage of multiple carriers to expand the effective coverage area of the ruggedized voice and data communication system 12-1 in remote areas and provide a double failover capacity by having two carriers as well as multiple cellular modems/transceivers. Having two carriers as well as multiple cellular modems/transceivers greatly expands coverage and reliability of the ruggedized voice and data communication system 12-1 as compared to the ruggedized voice and data communication system 12.

The ruggedized voice and data communication system 12-1 may be provided with the ruggedized enclosure 30, a plurality of communications boards 32 mounted within the enclosure 30, the power system 34 coupled to the communications board 32 and supplying power thereto in a predetermined voltage, and the antenna 38 coupled to the plurality of communications boards 32. In some embodiments, the antenna 38 may include a 0.7 GHz to 2.7 GHz combiner to provide a single external antenna to service the multiple cellular modems/transceivers of the communications boards 32.

In some embodiments, the plurality of communications boards 32 within the ruggedized voice and data communication system 12-1 may leverage coverage of multiple carriers (i.e., voice and data telecommunications providers) to expand effective coverage area of the system 12-1 in remote areas. In addition, in some embodiments, the plurality of communications boards 32 within the system 12-1 may provide a failover capacity by the inclusion of two or more modems and/or two or more carriers as described in further detail herein.

In some embodiments, one or more communications boards 32 within the ruggedized voice and data communication system 12-1 may be the only provider within the system for voice or data transmission. For example, the communications board 32-1 may be the only provider of cellular voice data (e.g., via GSM network connection). Network connectivity for voice transmission may be easier to establish versus network connectivity for data transmission. For example, reliable connections for a phone call through a GSM network may be more stable than establishment of a stable data connection as bandwidth needed for data is generally larger. To that end, multiple carrier functionality may be designed to provide redundancy and/or expand the scope of service for network connectivity in some embodiments.

The communications board 32-1 may be similar in construction and design as the communication board 32 illustrated in FIG. 2. For example, the communications board 32-1 may be provided with the first transceiver 40-1 and the second transceiver 40-2 with the first transceiver 40-1 configured to transmit and receive signals through the antenna 38. The first transceiver 40-1 may be a GSM transceiver capable of transmitting and/or receiving packetized voice and data transmissions over a GSM network, for example. The second transceiver 40-2 may be configured to transmit and/or receive signals via 802.11 protocols, for example, to form a LAN capable of receiving data via the first transceiver 40-1 and the antenna 38. The second transceiver 40-2 may be a wireless router implementing 802.11 communication protocols, for example.

The communications board 32-2 may include a third transceiver 40-3 configured to receive and transmit signals through the antenna 38. The third transceiver 40-3 may be capable of functioning on both GSM and CDMA cellular networks. For example, in some embodiments, the third transceiver 40-3 may be a 3G device capable of High Speed Packet Access (HSPA+) on GSM networks. Additionally, on CDMA networks, the 3G data protocol may be referred to as Enhanced Voice-Data Optimized (EVDO). Exemplary communications boards 32-2 may include, but are not limited to, the CloudGate manufactured and distributed by Option located in Rolling Meadows, Ill. In some embodiments, the third transceiver 40-3 is a 2-watt cellular device configured to only provide a cellular data connection that does not include the voice channel capabilities of the first transceiver 40-1.

In some embodiments, the communications board 32-2 may also include a fourth transceiver 40-4 configured to transmit and receive signals via 802.11 protocols, for example, to form a LAN capable of receiving data to be related via the third transceiver 40-3 and the antenna 38. In some embodiments, the fourth transceiver 40-4 may be implemented as a wireless router implementing 802.11 communication protocols, for example. Additionally, the communications board 32-2 may include one or more Ethernet ports, USB ports, serial ports, WiFi ports, general purpose input/output (ports, and/or the like.

In some embodiments, software and/or other computer executable logic stored on the communications board 32-1 may include one or more instructions for a failover process and/or switching process to switch the cellular network protocol that is being used to communicate with the cell tower 14. Generally, the communications board 32-1 and the communications board 32-2 may communicate via a communication line 110 (e.g., RJ45 Ethernet cable connection). As the communication board 32-2 has the ability to provide either a CDMA or a GSM connection to a network, the communications board 32-2 may serve as the primary network connection. The failover process may be initiated by the communication board 32-1 such that the third transceiver 40-3 of the communications board 32-2 serves as the primary network connection, and if the communications board 32-2 fails to provide the network connection, the first transceiver 40-1 of the communication board 32-1 may automatically provide the network connection on a GSM network, for example. In this example, the first transceiver 40-1 of the communications board 32-1 serves as the secondary network connection and the third transceiver 40-3 of the communications board 32-2 serves as the primary network connection.

Figure 7:
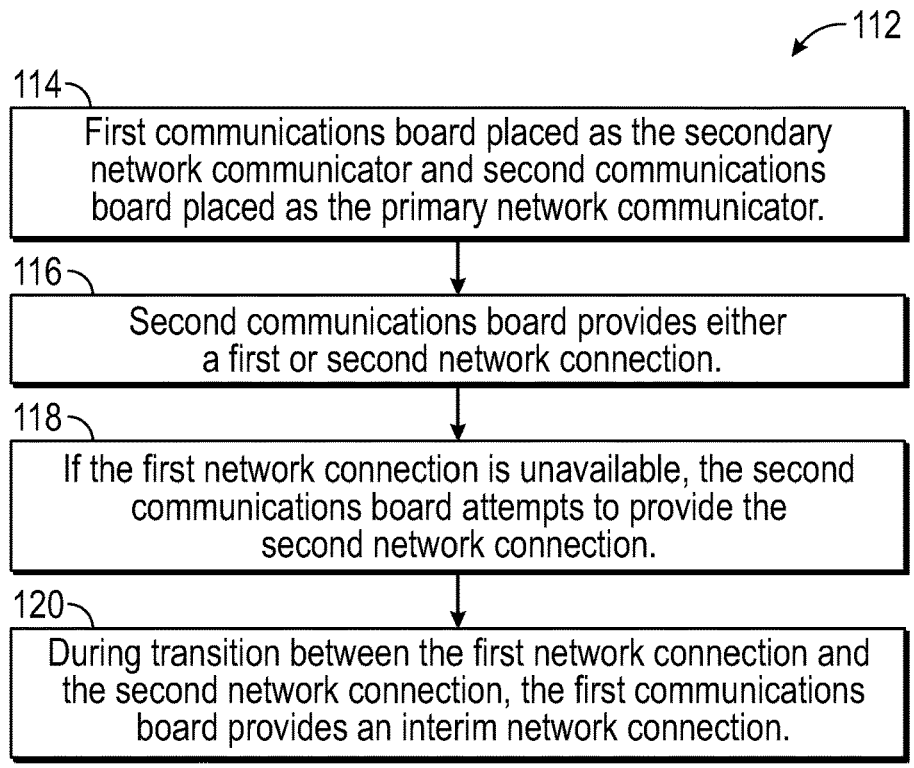
FIG. 7 is an exemplary logic flow diagram of a process for establishing communication between the ruggedized voice and data communication system of FIG. 6 and one or more Wide Area and/or cellular networks.

FIG. 7 illustrates a flow chart 112 of an exemplary method of providing a network connection to more than one type of cellular telephone network using the ruggedized voice and data communication system 12 having multiple cellular telephone transceivers on at least one of a plurality of communications boards 32.

In a step 114, the communications board 32-1 may be placed as the secondary network communicator and the communications board 32-2 may be placed as the primary network communicator. For example, in some embodiments, instructions when executed by one or more processors of the communications board 32-1 cause the communications board 32-1 to enter a failover mode such that a network connection is provided by the communications board 32-2.

In a step 116, the communications board 32-2 may provide either a first network connection (e.g., CDMA) or a second network connection (e.g., GSM). For example, in some embodiments, the communications board 32-2 may first identify and/or obtain a GSM network connection. If a GSM network connection is unavailable, in a step 118, the communications board 32-2 may attempt to provide a CDMA network connection.

During the transition between the GSM network connection and the CDMA network connection, for example, by the communications board 32-2, in a step 120, the communications board 32-1 may provide an interim network connection. This process may be automatic in that no user intervention is needed. Additionally, the logic running on at least one processor of the communications board 32-1 may perform one or more status checks on the network connection that may be provided by the communications board 32-1, and one or more status checks on the network connection provided by the communications board 32-2. If network connectivity is deemed insufficient (e.g., signal strength below a predetermined level, bandwidth below a predetermined level), the communications board 32-1 may seek to utilize connectivity via first transceiver 40-1 of the communications board 32-1 or the third transceiver 40-3 of the communications board 32-2 to establish sufficient network connectivity based on data obtained via the one or more status checks.

In some embodiments, additional communications boards 32 may be used. For example, a transceiver of a first communications board may utilize protocols conforming to requirements of GSM networking capabilities, a transceiver of a second communications board may utilize protocols conforming to requirements of GSM networking capabilities, and a transceiver of a third communications board may utilize protocols conforming to requirements of CDMA networking capabilities. In this example, the first, second and third communications board may be coupled such that the first communications board may monitor the second and third communications boards to determine the appropriate network connectivity to be used to as described herein.

Although the preceding description has been described herein with reference to particular means, materials, and embodiments, it is not intended to be limited to the particulars disclosed herein; rather, it extends to functionally equivalent structures, methods, and uses, such as are within the scope of the appended claims.

What is claimed is:

1. A ruggedized voice and data communication system, comprising:
a ruggedized enclosure including:
at least two communications boards connected to the ruggedized enclosure, each communications board having at least one transceiver and a plurality of interfaces, with a first communications board including a primary network communicator and a second communications board including a secondary network communicator, the primary network communicator having a non-transitory memory connected to a processor, the non-transitory memory having computer-executable instructions stored thereon that, when executed by the processor, cause the processor to attempt a first network connection using at least one transceiver and upon failure enter a failover mode such that a second network connection is directly provided by the second communications board;
a power system having a battery and a power supply; and
at least one antenna external to the ruggedized enclosure and in communication with at least one of the at least one transceiver, the antenna configured to transmit and receive signals for the at least one transceiver.

2. The ruggedized voice and data communication system of claim 1, wherein the battery is configured to supply the communications board with power at a predetermined voltage, the power supply including a switching power supply configured to receive a first voltage from the battery and convert the first voltage to a second voltage and provide the second voltage to the communications board to operate the communications board in the absence of AC power wherein the second voltage is equal in voltage and frequency to the predetermined voltage supplied by the battery.

3. The ruggedized voice and data communication system of claim 2, wherein the battery is a gel cell battery.

4. The ruggedized voice and data communication system of claim 1, wherein the at least one transceiver includes a first transmitter and the at least one antenna is a high-gain monopole antenna coupled to the first transmitter.

5. The ruggedized voice and data communication system of claim 4, wherein the first transmitter is a high-power transmitter.

6. The ruggedized voice and data communication system of claim 1, wherein the transceiver of the communications board conforms to the requirements of a Global System for Mobile communications protocol adapted to transmit packetized voice and data transmissions.

7. The ruggedized voice and data communication system of claim 1, wherein the ruggedized enclosure is formed of a resin material.

8. The ruggedized voice and data communication system of claim 7, wherein the ruggedized enclosure includes a plurality of sides defining an interior and an exterior with a plurality of through holes formed in at least one side extending from the exterior to the interior of the ruggedized enclosure.

9. The ruggedized voice and data communication system of claim 8, wherein at least one through hole is dimensioned and configured to permit at least one fan to circulate air through the interior of the ruggedized enclosure.

10. The ruggedized voice and data communication system of claim 8, further comprising a plurality of ports connected to the ruggedized enclosure, and wherein certain of the ports are connected to certain of the plurality of interfaces of the communications board and certain of the ports are connected to the power system wherein at least one through hole provides a port opening for at least one port.

11. The ruggedized voice and data communication system of claim 8, wherein at least one through hole is configured to receive a connection member to mount a jacking plate to the interior of the ruggedized enclosure.

12. The ruggedized voice and data communication system of claim 8, wherein a power system mounting plate is mounted to the interior of the ruggedized enclosure configured to mount the power system within the ruggedized enclosure.

13. The ruggedized voice and data communication system of claim 12, wherein the communications board is mounted to a user interface plate and the user interface plate is connected to the power system mounting plate.

14. The ruggedized voice and data communication system of claim 13, wherein the communications board is mounted to the user interface plate using at least one spacer element to mount the communications board at a distance from the user interface plate.

15. The ruggedized voice and data communication system of claim 1, wherein the at least one transceiver of the first communication board includes at least a first transceiver and a second transceiver, and wherein the first transceiver is a cellular telephone transceiver, and the second transceiver is configured to transmit and receive signals conforming to a protocol adapted to form a local area network.

16. The ruggedized voice and data communication system of claim 15, wherein the first transceiver is configured to transmit at frequencies between 670 MHz and 6.0 GHz.

17. The ruggedized voice and data communication system of claim 15, wherein the second transceiver includes a wireless router.

18. The ruggedized voice and data communication system of claim 1, wherein the at least one transceiver of the first communications board is configured to provide a first network GSM connection and at least one transceiver of the second communications board is configured to provide a second network GSM connection, and wherein the non-transitory memory of the first communications board further includes instructions stored thereon that, when executed by the processor, cause the processor to attempt the first network connection using the first communications board and upon failure enter failover mode.

19. The ruggedized voice and data communication system of claim 18, wherein the second communications board having a non-transitory memory connected to a processor, the non-transitory memory having computer-executable instructions stored thereon that, when executed by the processor, cause the processor to attempt the second network connection using the second communications board.

20. The ruggedized voice and data communication system of claim 1, wherein the at least one external antenna includes a plurality of external antennas for transmitting and receiving signals between each transceiver and the communications tower.

21. The ruggedized voice and data communication system of claim 1, wherein the external antenna includes a combiner configured to provide service for each of the communication boards.

22. The ruggedized voice and data communication system of claim 1, wherein at least one interface of the at least two communication boards conforming to the requirements of a plain old telephone system interface configured to provide telephone service functionality to an analog telephone.

23. A ruggedized voice and data communication system, comprising:
a ruggedized enclosure;
a plurality of transceivers connected to the ruggedized enclosure with a first transceiver of the plurality of transceivers configured to communicate via a first protocol conforming to the requirements of a first network and a second transceiver of the plurality of transceivers configured to communicate via a second protocol conforming to the requirements of a second network, the first network and the second network being different types of cellular telephone networks wherein the first transceiver is configured to provide a first network GSM connection to the first network and the second transceiver is configured to provide a second network GSM connection to the second network;
at least one processor running failover logic configured to switch communications from the first transceiver to the second transceiver responsive to the first transceiver failing to provide the first network GSM connection with the first network;
a power system having a battery and a power supply, the battery configured to supply the plurality of transceivers with power at one or more predetermined voltages, the power supply configured to receive a first voltage and convert the first voltage to a second voltage and provide the second voltage to at least one of the plurality of transceivers; and,
at least one antenna positioned exterior to the ruggedized enclosure and in communication with the plurality of transceivers, the at least one antenna configured to connect with cell towers in remote areas.

24. The ruggedized voice and data communications system of claim 23, wherein the first network conforms to the requirements of a Global System for Mobile communications network and the second network conforms to the requirements of a Code-Division Multiple Access network.

* * * * *